United States Patent [19]

Finn

[11] Patent Number: 5,462,204

[45] Date of Patent: Oct. 31, 1995

[54] FOAM DISPENSING GUN

[75] Inventor: Clifford J. Finn, Milwaukee, Wis.

[73] Assignee: RHH Foam Systems, Inc., Cudahy, Wis.

[21] Appl. No.: 219,151

[22] Filed: Mar. 29, 1994

[51] Int. Cl.⁶ ....................................................... B67D 5/52
[52] U.S. Cl. ................. 222/137; 222/145.6; 222/153.13; 222/459; 222/570; 239/414; 239/432; 239/600
[58] Field of Search .................................. 222/135, 137, 222/145, 146, 153, 459, 567; 239/414, 432, 600

[56] References Cited

U.S. PATENT DOCUMENTS

| | | | |
|---|---|---|---|
| 2,890,836 | 6/1959 | Gusmer et al. | |
| 3,176,922 | 4/1965 | Decker | 239/112 |
| 3,558,051 | 1/1971 | Strickler et al. | 222/145 X |
| 3,640,434 | 2/1972 | Walker | 222/145 X |
| 3,784,110 | 1/1974 | Brooks | 239/304 |
| 3,837,575 | 9/1974 | Lehnert | 239/112 |
| 4,117,551 | 9/1978 | Brooks et al. | 366/162 |
| 4,311,254 | 1/1982 | Harding | 222/145 |
| 4,350,298 | 9/1982 | Tada | 239/600 X |
| 4,399,930 | 8/1983 | Harding | 222/145 |
| 4,458,831 | 7/1984 | Holleran et al. | 222/134 |
| 4,516,694 | 5/1985 | Finn | 222/148 |
| 4,550,063 | 11/1985 | Farrey | 222/145 |
| 4,603,813 | 8/1986 | Luegering | 239/399 |
| 4,634,029 | 1/1987 | Hauser | 222/567 |
| 4,676,437 | 6/1987 | Brown | 239/414 |
| 4,762,253 | 8/1988 | Palmert | 222/145 |
| 4,901,888 | 2/1990 | Standlick | 222/148 X |
| 4,925,107 | 5/1990 | Brown | 239/414 |
| 4,993,596 | 2/1991 | Brown | 222/145 |
| 5,092,492 | 3/1992 | Centea | 222/145 X |
| 5,104,006 | 4/1992 | Brown | 222/145 |
| 5,129,581 | 7/1992 | Braun et al. | 239/414 |
| 5,242,115 | 9/1993 | Brown | 239/414 |
| 5,246,143 | 9/1993 | Cherfane | 222/148 X |
| 5,265,761 | 11/1993 | Brown | 222/1 |

*Primary Examiner*—Andres Kashnikow
*Assistant Examiner*—Joseph A. Kaufman
*Attorney, Agent, or Firm*—Quarles & Brady

[57] ABSTRACT

A foam dispensing gun has a body with a depending handle. The body has two passageways divided into forward and rearward portions by an intermediate chamber. A hose connector and duck-bill one-way valve are mounted in the rearward portion of each passageway, and a valve member extends through both the forward and rearward portions of each passageway. The valve member has a conical needle valve mating with a conical valve seat that opens directly to the nose of the body. A trigger lever is pivotally mounted in the chamber and engages the valve members to open and close the valves. A disposable nozzle with a mixing chamber and outlet is attached about the nose of the body by resilient arms engaging with ears extending from the body.

26 Claims, 3 Drawing Sheets

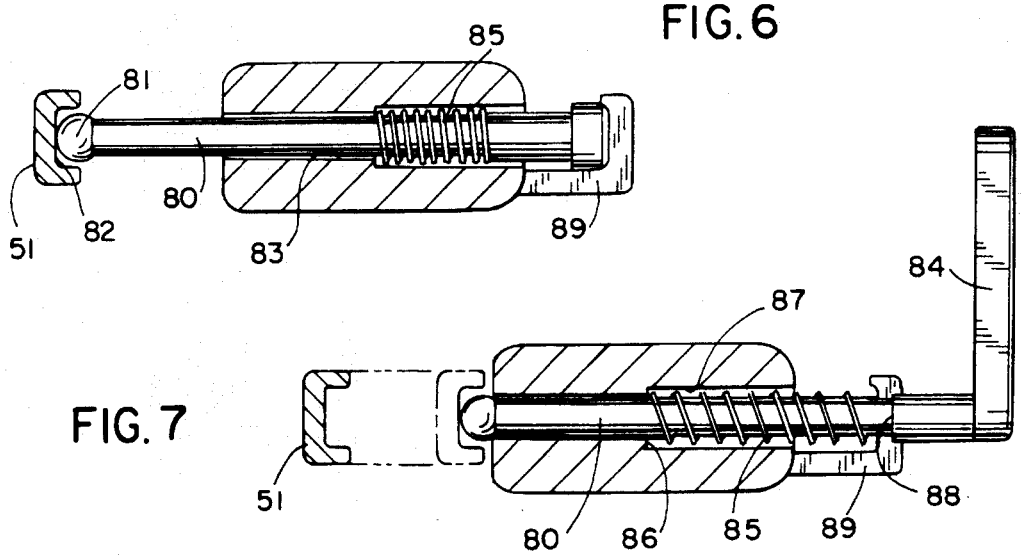
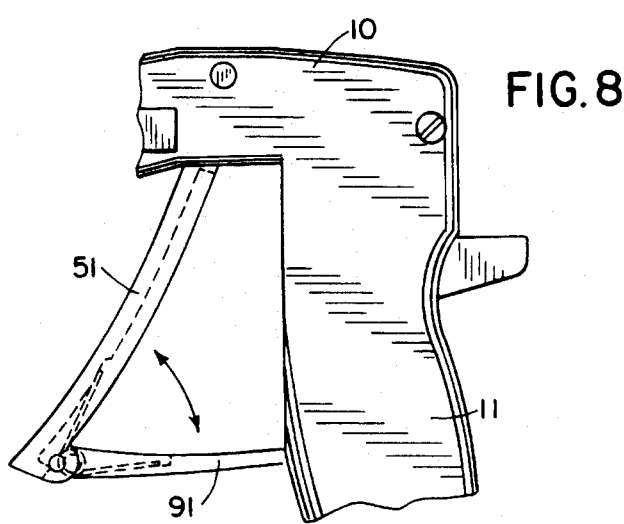
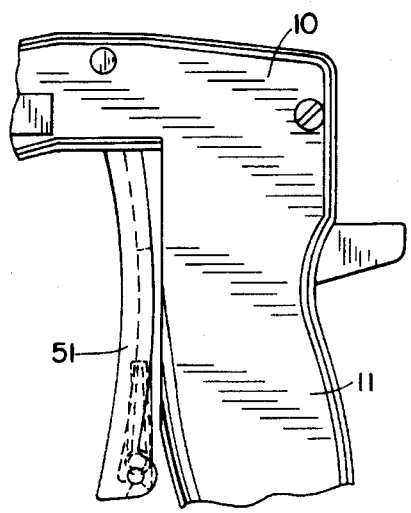
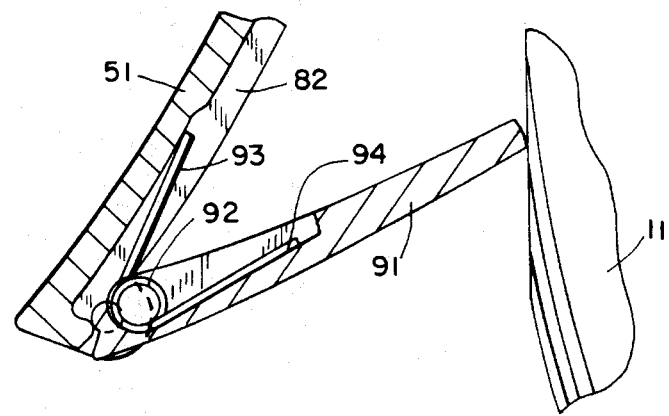

FOAM DISPENSING GUN

BACKGROUND OF THE INVENTION

This invention relates to a dispensing gun, and more particularly to a gun to be used with systems in which two or more fluid components that are separately stored in pressurized vessels are mixed and dispensed from the gun as a settable foam.

Manually operable guns are known for dispensing a settable urethane foam. Separate fluid components are fed individually to the gun, passed separately through control valves, and brought into contact with each other upon reaching a mixing chamber of a nozzle from which the mixed components are discharged as foam. Examples of such guns are found in U.S. Pat. Nos. 4,311,254 and 4,399,930 issued to Gary Harding and in U.S. Pat. No. 4,762,253 issued to Steven Palmert.

The two fluid components are commonly referred to as the "A resin" and the "B resin". They usually consist of polymeric isocyanate and polyol amine, respectively. The components are supplied separately in two pressurized containers that are attached by hoses to inlets to the guns. When the two fluid components or resins are mixed, the mixture quickly sets up to form a rigid foam product which is substantially insoluble and extremely difficult to remove from surfaces with which it comes in contact. As a result, the nozzles for the guns in which the two components are first mixed are typically designed to be replaceable and disposable so as to avoid the necessity for cleaning the nozzles.

Because of the quick set-up of the mixture of the two components, it is also important to keep the components separate within the gun so that their only contact is in the mixing chamber of the disposable nozzle. The two components are usually under different pressures in the respective tanks. If the nozzle should plug and the valves of the gun are opened, the higher pressure fluid could contaminate the lower pressure fluid and cause set-up of the resins within the gun thereby rendering the gun useless.

One of the components, the "A resin", has a tendency to harden on exposure to air. Even if the valves of the gun are closed, it is possible for the "A resin" to harden internally of the gun if exposed to air. That problem has been addressed in the past by adding a solvent flushing port to the "A resin" side of the gun body as shown in U.S. Pat. No. 4,516,694 issued to Clifford J. Finn.

SUMMARY OF THE INVENTION

It is a principal object of the invention to provide a foam dispensing gun that prevents set up or hardening of components within the gun such that the gun is reusable.

It is another object of the present invention to provide a foam dispensing gun which prevents cross-over of one component to the other internal of the gun and prevents air-hardening of either component internally of the gun.

It is a further object of the invention to provide a foam dispensing gun including a disposable nozzle that is quickly and easily attached and removed.

In accordance with the invention, a foam dispensing gun includes a body with a pair of longitudinal passageways leading from a respective inlet at one end to a valve seat at the other end that opens to a nose of the body. A nozzle is connected to the body just beyond the valve seats and includes an outlet and a mixing chamber between the valve seats and the outlet. A valve member is disposed in each passageway. Each valve member has a forward valve portion that mates with its respective valve seat and a rearward portion that seals off its passageway. Each valve member includes an internal passage in fluid communication with the inlet of its respective passageway and which internal passage terminates in a port short of the valve portion. A seal seals the port and valve portion from the remainder of the passageway. The valve members in their closed position seat against and fill the valve seats. The valve members are manually movable to open the valves and allow fluid components connected to the passageway inlets to enter the mixing chamber.

In the preferred embodiment, the valve seats are conical and the valve portion of the valve members are mating conical needle valves. Springs normally urge the valve members to a closed position.

Also in the preferred embodiment, the pair of valve members are opened by a single manually operable trigger that includes a lever pivotally mounted in a chamber in the body that divides the passageways into forward and rearward portions. The valve members span the chamber and are sealed to both the forward and rearward portions of the passageways. The trigger engages the valve members in the chamber. The lever extends downwardly from the body and opposes a handle attached to the body.

Further in accordance with the invention, a one-way valve is disposed in each of the passageways between the inlet and a respective valve member. Preferably, the one-way valve is a duck-bill valve.

Further in accordance with the invention, the nozzle is detachable from the body. The body has a pair of ears extending from opposite sides of the body and the nozzle is formed with a pair of resilient arms that are engageable with the ears when the nozzle is in place on the body but which are disengageable from the ears by depressing the resilient legs.

The foregoing and other objects and advantages of the invention will appear in the detailed description which follows. In the description, reference is made to the accompanying drawings which illustrate preferred embodiments of the invention.

BRIEF SUMMARY OF THE DRAWINGS

FIG. 6 is a horizontal view through a portion of a first embodiment of a safety mechanism and taken in the plane of the line 6—6 in FIG. 1;

FIG. 7 is a view similar to FIG. 6 but showing the safety device of FIG. 6 in a released condition;

FIG. 8 is a partial view in elevation of a second embodiment of a safety mechanism and showing the safety engaged;

FIG. 9 is a view similar to FIG. 8 but showing the second embodiment of the safety mechanism in a released condition; and FIG. 10 is an enlarged view partially in section of a portion of the safety mechanism of FIGS. 8 and 9.

DETAILED DESCRIPTION OF THE PREFERRED EMBODIMENTS

Figure 1:
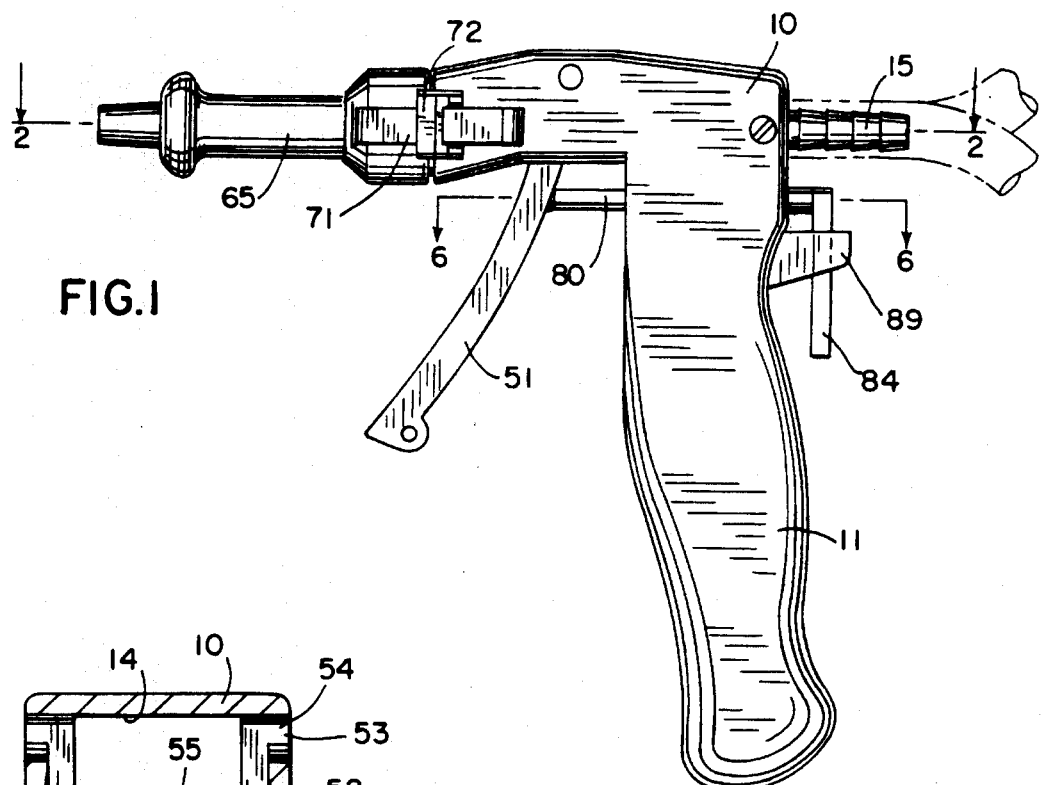
FIG. 1 is a view in elevation of a foam dispensing gun in accordance with the present invention.

Referring to FIGS. 1–5, the foam dispensing gun includes a body 10 with a handle 11 that may be formed integral with the body 10. The body 10 and handle 11 may be molded from a synthetic resin material. The body 10 is formed with a pair of longitudinal, parallel passageways 12 and 13. The passageways 12 and 13 are divided into forward and rearward portions by an intermediate chamber 14. The rearward portions of the passageways 12 and 13 mount brass connectors 15 that have a ribbed end for attachment to hoses connected to pressurized containers for fluid components that are used to form the foam. The connectors 15 are held in place in the body 10 by set screws 16 extending transversely to the passageways 12 and 13 and received in annular recesses 17 in the connectors 15. The connectors 15 each have a second annular recess 18 interior of the body 10. The second annular recess 18 mounts an O-ring 19 that seals with the rearward portion of the passageway 12 or 13.

Brass bushings 22 are mounted in the passageways 12 and 13 forward of the connectors 15. The bushings 22 include annular recesses to mount O-rings 24 that seal with the rearward portions of the passageways 12 and 13.

Figure 4:
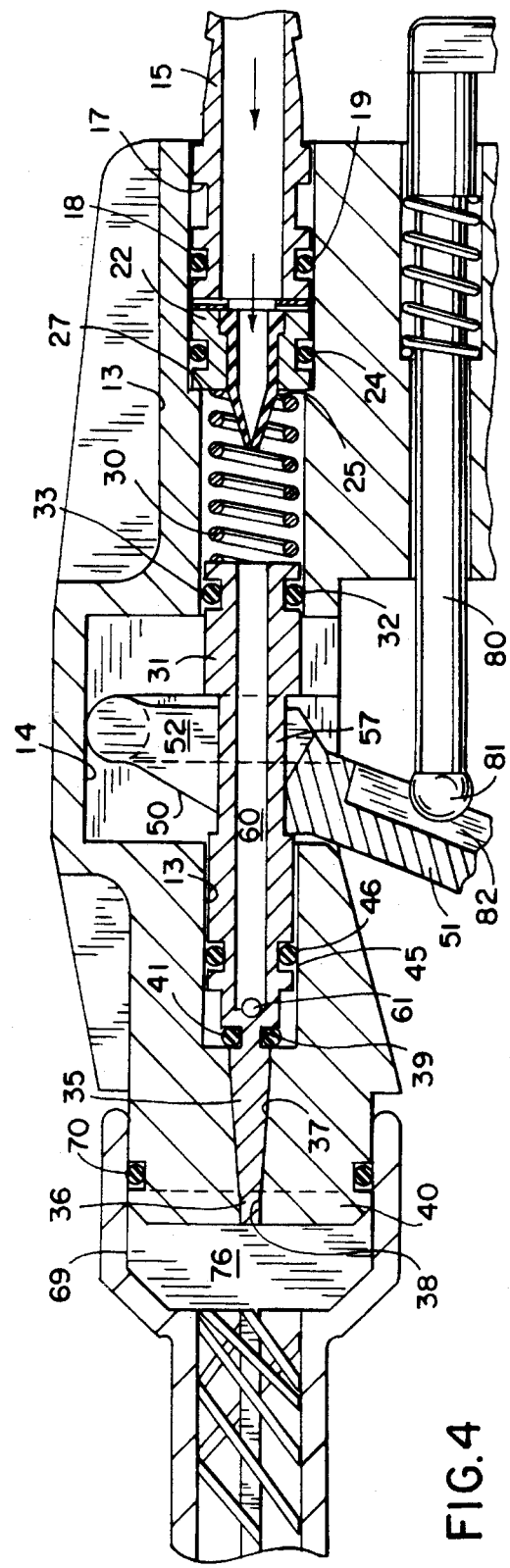
FIG. 4 is a partial view in vertical section taken in the plane of the line 4—4 in FIG. 2 and to an enlarged scale.

As shown in FIG. 4, the connectors 15 are hollow and define inlets leading from the tanks of components. The bushings 22 are also hollow and mount duck-bill valves 25 in their center. The duck-bill valves 25 are formed of a rubber or other elastomeric material and function as one-way valves to permit fluid under pressure to enter a passageway 12 or 13. The duck-bill valves 25 will close to seal off the inlets when a higher back pressure is applied to the exterior of the duckbill valves 25.

Each bushing 22 is disposed against a bellville spring 26 which bears against an end of the respective connector 15 thereby urging the bushing 22 inwardly in the passageway 12 or 13 until it abuts against a shoulder 27. A coiled spring 30 is disposed in each of the passageways 12 and 13. The spring 30 bears at one end against an end of a respective bushing 22. The other ends of the springs 30 bear against the ends of brass needle valve members 31 also disposed in the passageways 12 and 13.

The needle valve members 31 span the chamber 14 and are received in both the forward and rearward portions of the passageways 12 and 13. The needle valve members 31 have a rear portion provided with a radial recess 32 that mounts an O-ring 33 to seal with the rearward portion of the passageway 12 or 13. The forward portion of each valve member 31 is formed as a conical needle valve 35 terminating in a circular cylindrical tip 36. The conical needle valve 35 and tip 36 mate with a conical valve seat 37 having a circular cylindrical extension 38 and formed in the body 10 at the front terminus of the passageways 12 and 13.

The valve seats 37 open directly through the front face of a nose 40 on the body 10. The valve members 31 have an annular recess 39 behind the conical needle valve portion 35. The recess 39 mounts an O-ring 40 that seals the junction of the needle valve portion 35 and the conical valve seat 37 when the valve is closed, as shown in FIG. 4. The valve members 31 have an additional annular recess 45 that mounts an O-ring 46 that seals with the forward portions of the passageways 12 and 13.

Figure 3:
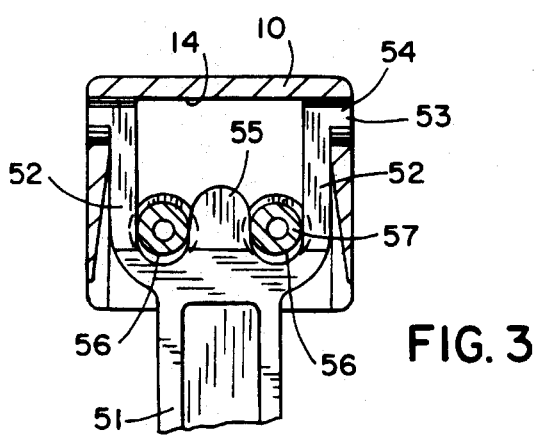
FIG. 3 is a view in vertical section taken in the plane of the line 3—3 in FIG. 2.

The chamber 14 mounts a yoke 50 formed at the top of a trigger lever 51. The yoke 50 has a pair of arms 52 terminating in lateral bosses 53 that are received for pivotal movement in holes 54 in the two sides of the body 10, as shown in FIG. 3. The yoke 50 also includes a central rib 55 which, with the arms 52, defines two spaced cradles 56 that receive necked down portions 57 intermediate the ends of the valve members 31. The springs 30 normally urge the valve members 31 forwardly to close the needle valves 35 against the valve seats 37. The trigger lever 52 can be rotated to withdraw the valve members 31 against the urgings of the springs 30 to open the valves.

Figure 5:
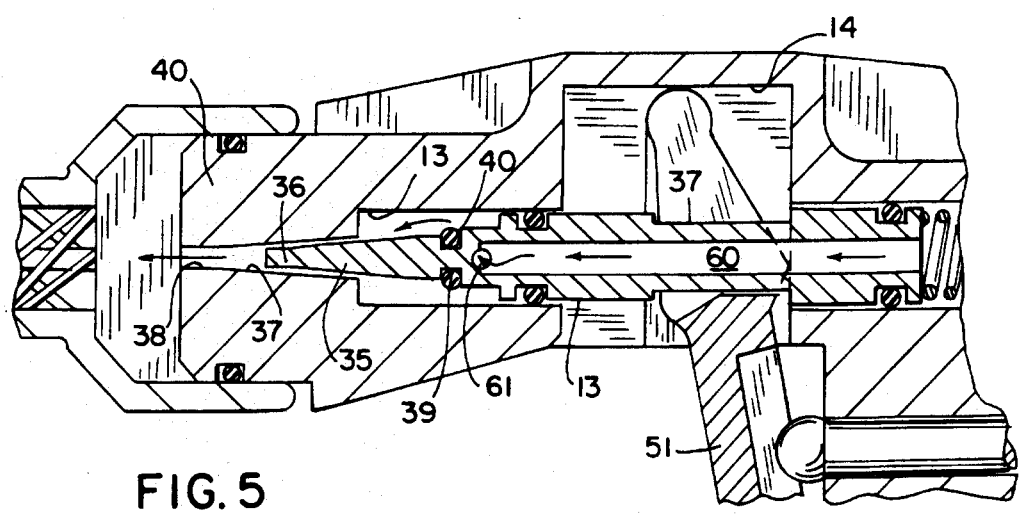
FIG. 5 is a view similar to FIG. 4 but showing the valve members in an open position.

Each valve member 31 has a central internal passage 60 that terminates in a transverse port 61 that extends to the surface of the valve member at a point between the O-rings 40 and 46. As shown in FIG. 5, when the trigger lever 52 is squeezed to open the valves, fluid from the pressurized containers can pass through the central passages 60 in the valve members 31, out the ports 61, through the valve seats 37, and out of the front nose 40 of the body 10. The O-rings 46 prevent fluid from moving rearwardly along the passageways 12 or 13. As the valves are closed, the conical needle valve portions will extrude materials forwardly out of the valve seats. The seating of the needle valve in the valve seat combined with the O-rings 40 will seal off the interior of the passageways and prevent air from reaching the fluid resins in such passageways.

A disposable nozzle 65 is mounted on the front of the gun. The nozzle 65 has a hollow interior that defines a mixing chamber 66 and an outlet 67. A helical static mixer 68 of known construction is mounted in the mixing chamber 66. The front end of the nozzle forward of the mixing chamber 66 has an enlarged circular cylindrical portion 69 which surrounds the nose 40 of the body 10 and is sealed thereto by an O-ring 70. The cylindrical portion 69 also defines an open inlet chamber. A pair of resilient arms 71 extend along either side of the nozzle rearwardly from the enlarged cylindrical portion 69. The resilient arms 71 are adapted to engage ears 72 that extend from opposite sides of the body 10 adjacent the nose 40. The resilient arms 71 have a curved portion 73 adjacent their ends which terminates in a notch 74 that mates with an ear 72. The nozzle can be quickly attached to the body 10 by sliding the resilient arms 71 beneath the ears 72. The curved portions 73 will cam the arms 71 so that the arms will slide easily past the ears 72 until the notches 74 engages with the ears 72. The nozzles 65 can be easily removed by manually depressing the curved ends 73 of the arms 71 to release the notches 74 from the ears 72 and allow the arms 71 to slide past the ears 72.

Figure 2:
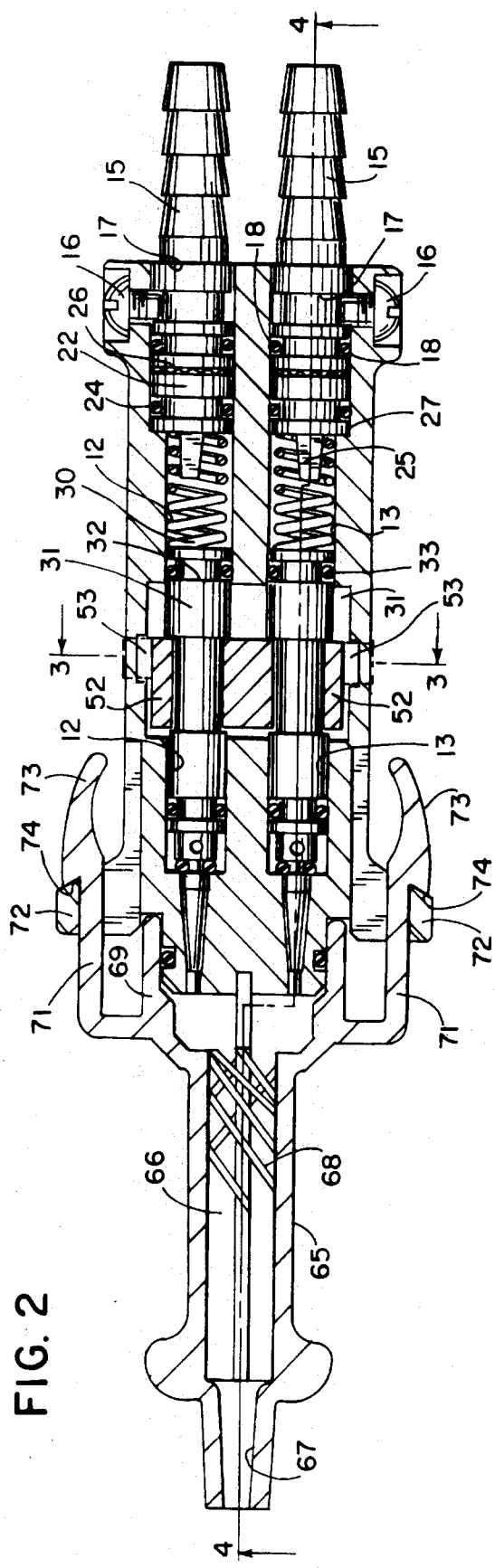
FIG. 2 is a view in horizontal section taken in the plane of the line 2—2 of FIG. 1.

The static mixer 68 includes a wall portion 76 which is located in the open inlet chamber defined by the enlarged cylindrical end 69 of the nozzle. As shown in FIG. 2, the wall portion 76 divides the inlet chamber and is positioned between the valve seats 37 so that complete mixing of the two fluid components does not occur immediately at the nose 40. If the nozzle 65 should become clogged with foam and not be replaced, the subsequent opening of the valves could result in the fluid of higher pressure being forced from the mixing chamber through the valve seat for the other component in the reverse direction. The duckbill valves 25 prevent such cross-contamination which would result in set-up of the components within the gun if allowed to occur.

A safety is provided to prevent the accidental movement of the trigger. In one embodiment, the safety comprises a rod 80 having a bulbous end 81 that rides in a channel 82 along the inside of the trigger lever 51. The rod 80 is supported in a bore 83 in the handle 10 and terminates in a transverse handle 84. A spring 85 is disposed between a shoulder 86 formed by a counterbore 87 and a shoulder 88 on the rod 80. The rod 80 is adapted to be moved between an inoperative position as shown in FIG. 7 where it does not restrict movement of the trigger lever and an operative position as shown in FIG. 6 in which the spring 85 is compressed and the rod 80 is extended to a position where the handle 84 can engage with a bracket 89 extending rearwardly from the gun handle 11. In such position, the trigger lever is prevented from being moved and the gun is locked in a closed position.

An alternative safety is shown in FIGS. 8–10. The alternative safety utilizes a second lever 91 which is pivotally attached at one end to the lower end of the trigger lever 51. A coil spring 92 is mounted in the junction of the lever 91 and trigger lever 51 and has extending ends 93 and 94 which bear against the insides of the trigger lever 51 and safety lever 91 to tend to spread the two apart. When the two levers are spread apart, the safety lever 91 will engage with the gun handle 11 to block movement of the trigger lever. The safety mechanism can be released by moving the safety lever 91 upwardly.

I claim:

1. A foam dispensing gun, comprising:

a body having a pair of longitudinal passageways each including an inlet at one end adapted to be connected to a source of a pressurized fluid component, each passageway also including a conical valve seat at the other end of the passageway that opens to a nose at the end of the body;

a nozzle connected to the body and surrounding the nose, the nozzle including an outlet and a mixing chamber disposed between the nose and the outlet;

a valve member disposed in each passageway, each valve member having a forward needle portion with a conical outer surface that mates with the like surface of a respective valve seat and a rearward portion that seals off the respective passageway, each valve member also having an internal passage in fluid communication with the inlet of its respective passageway and terminating in a port short of the needle portion;

a spring connected to urge each valve member to a closed position in which the needle portion seats against the respective valve seat; and a manually operable trigger to move the valve members to an open position against the urging of the springs.

2. A dispensing gun in accordance with claim 1 wherein each needle portion has a circular cylindrical portion extending from the tip of the needle portion and the valve seats have mating circular cylindrical openings extending from the conical portions of the valve seats and opening into the mixing chamber of the nozzle.

3. A dispensing gun in accordance with claim 1 together with a one way valve disposed in each of the passageways between the inlet and a respective valve member.

4. A dispensing gun in accordance with claim 3 wherein the one way valve is a duck-bill valve.

5. A dispensing gun in accordance with claim 1 together with a handle attached to the body and wherein the manually operable trigger comprises a lever pivoted to the body and engaging the valve members intermediate the needle portions and rear portions, said lever opposing the handle.

6. A dispensing gun in accordance with claim 1 wherein the nozzle is detachable from the body.

7. A dispensing gun in accordance with claim 6 wherein the body has a pair of ears extending from opposite sides thereof and the nozzle is formed with a pair of resilient arms engageable with the ears when the nozzle is in place on the body but disengageable from the ears by depressing the resilient arms.

8. A dispensing gun in accordance with claim 1 together with a seal between the conical surface of the needle portion of each valve member and the port that seals the junction of the conical surface of the needle portion and the valve seat from the port when the valve members are in the closed positions.

9. A dispensing gun in accordance with claim 8 wherein the seal comprises an O-ring disposed in an annular recess at the rear of the conical portion.

10. A dispensing gun in accordance with claim 8 together with an O-ring seal disposed about each valve member behind the port and sealing with the respective passageway.

11. A foam dispensing gun, comprising:

a body with a depending handle, the body including a pair of parallel longitudinal passageways each having a forward portion and a rearward portion interrupted by a chamber that is open to the bottom of the body, the forward portion of each passageway terminating in a valve seat in a nose of the body, and the rearward portion defining an inlet for a fluid component;

a removable nozzle connected to the body and surrounding the nose, the nozzle including a mixing chamber beyond the valve seats and an outlet;

a pair of valve members disposed in the passageways and spanning the chamber, each valve member having a forward valve portion that is adapted to seat against a respective valve seat;

front and rear seals sealing each valve member with both the forward and rearward portions, respectively, of its passageway;

each valve member including a central passage in fluid communication with the inlet of its respective passageway and terminating in a port that is forward of the front seal; and a trigger lever mounted to the body in the chamber and engaging the valve members for movement of the valve members between open and closed positions with respect to the valve seats.

12. A dispensing gun in accordance with claim 11 wherein the valve portion of each valve member is a needle valve having a conical surface and the valve seats each have a mating conical surface.

13. A dispensing gun in accordance with claim 12 together with a seal between the conical surface of the needle portion of each valve member and the port that seals the junction of the conical surface of the needle portion and the valve seat from the port when the valve members are in the closed position.

14. A dispensing gun in accordance with claim 11 wherein the trigger lever includes a yoke having spaced arms with lateral cylindrical bosses received for pivoting in openings in the sides of the body chamber.

15. A dispensing gun in accordance with claim 14 wherein the trigger lever opposes the handle and a releasable safety is provided between the lever and the handle to prevent the trigger lever from being moved to open the valve members.

16. A dispensing gun in accordance with claim 11 together with a hollow connector received in the rearward portion of each passageway and adapted to connect to a hose leading to a source of pressurized fluid.

17. A dispensing gun in accordance with claim 16 together with a one-way valve in each passageway between the connector and the valve member.

18. A dispensing gun in accordance with claim 17 wherein the one-way valve is a duck bill valve mounted in a bushing sealed with the passageway.

19. A dispensing gun in accordance with claim 18 together with a compression spring in each passageway between the bushing and the valve member to urge the valve member to a closed position.

20. A dispensing gun in accordance with claim 11 wherein the body has a pair of ears extending from opposite sides thereof and the nozzle is formed with a pair of resilient arms engageable with the ears when the nozzle is in place on the body but disengageable from the ears by depressing the resilient arms.

21. In a foam dispensing gun having a body with a nose through which two fluid components can be ejected and a disposable nozzle attached to the body, the improvement wherein:

the body has a pair of ears extending from opposite sides and the nozzle is formed with a pair of resilient arms engageable with the ears when the nozzle is in place on the body but disengageable from the ears when the arms are squeezed toward the body.

22. A dispensing gun in accordance with claim 21 wherein the ears each have an opening through which an arm can extend, and each arm has a curved end that engages an ear and cams the arm inwardly as the nozzle is inserted on the body, and each arm also has a notch that receives the respective ear when the nozzle is seated on the body.

23. A foam dispensing gun, comprising:

a body having a pair of spaced longitudinal passageways each including an inlet at one end adapted to be connected to a source of a pressurized fluid component, each passageway opening to a nose at the other end of the body; and a disposable nozzle connected to the body and having an open inlet chamber surrounding the nose, the nozzle including a wall portion dividing the inlet chamber and disposed between the openings to the longitudinal passageways, the nozzle further including an outlet and a mixing chamber disposed between the wall portion and the outlet, the wall portion extending longitudinally from the nose toward the mixing chamber.

24. A dispensing gun in accordance with claim 23 wherein the nozzle is detachable from the body.

25. In a foam dispensing gun having a body with a nose having a pair of spaced openings through which two fluid components can be respectively ejected and a disposable nozzle attached to the body, the improvement wherein:

the nozzle has an inlet that fits around the nose and includes an open inlet chamber and a wall portion that divides the inlet chamber and extends transverse to the nose between the openings, the nozzle further includes an outlet and a mixing chamber between the wall portion and the outlet, and the wall portion extends longitudinally from the nose toward the mixing chamber.

26. A removable nozzle for attachment to the nose of a foam dispensing gun through which two fluid components are ejected through a pair of spaced openings, the nozzle having:

an outlet end;

an inlet end adapted to fit to the nose of the gun and including an open inlet chamber a transverse wall portion that is adapted to be disposed against the nose and between the openings, the wall portion extending longitudinally toward the outlet end; and a mixing chamber between the wall portion and the outlet end.

* * * * *